United States Patent [19]

Yoshida et al.

[11] 4,389,445
[45] Jun. 21, 1983

[54] DATA RECORDING SHEET

[75] Inventors: Masafumi Yoshida; Kenichi Nakamura, both of Iwaki, Japan

[73] Assignee: Kureha Kagaku Kogyo Kabushiki Kaisha, Tokyo, Japan

[21] Appl. No.: 55,836

[22] Filed: Jul. 9, 1979

[30] Foreign Application Priority Data

Jul. 10, 1978 [JP] Japan ........................... 53/83008

[51] Int. Cl.³ ................ B32B 3/02; B32B 7/02; H01L 41/08; H01L 41/18
[52] U.S. Cl. ...................... 428/77; 310/311; 310/340; 310/364; 310/367; 310/800; 346/135.1; 427/100; 428/209; 428/212; 428/421; 428/458; 428/462; 428/480; 428/910
[58] Field of Search ............ 250/211 R, 330, 332; 310/800, 311, 340, 363, 364, 367; 427/100; 428/212, 421, 458, 463, 913, 77–79, 195, 206, 207, 209, 461, 462, 480, 910; 346/150, 135.1

[56] References Cited

U.S. PATENT DOCUMENTS

| | | | |
|---|---|---|---|
| 3,365,593 | 1/1968 | Roof et al. | 310/800 X |
| 3,772,518 | 11/1973 | Murayama et al. | 250/211 R |
| 3,798,473 | 3/1974 | Murayama et al. | 310/800 X |
| 3,832,580 | 8/1974 | Yamamuro et al. | 310/800 X |
| 3,894,198 | 7/1975 | Murayama et al. | 310/800 X |
| 3,912,830 | 10/1975 | Murayama et al. | 310/800 X |
| 3,931,446 | 1/1976 | Murayama et al. | 428/421 |
| 3,971,250 | 7/1976 | Taylor | 310/800 X |
| 3,985,914 | 10/1976 | Sasaki et al. | 427/100 X |
| 4,047,998 | 9/1977 | Yoshikawa et al. | 427/100 X |
| 4,049,859 | 9/1977 | Yoshikawa et al. | 427/100 X |
| 4,057,660 | 11/1977 | Yoshida et al. | 427/100 |
| 4,156,800 | 5/1979 | Sear et al. | 310/800 X |

*Primary Examiner*—Bruce H. Hess
*Attorney, Agent, or Firm*—Sughrue, Mion, Zinn, Macpeak and Seas

[57] ABSTRACT

A data recording sheet in which data signals are stored in a polarizable macromolecular material sheet layer with polarization different locally in the direction of the surfaces of said sheet layer. The sheet layer causes pyroelectric or piezo-electric polarization through polarization operation, and the data signals thus stored are reproduced in a pyroelectric or piezo-electric mode. The polarizable macromolecular material sheet layer is laminated through a thin intermediate electrode layer on a macromolecular substrate layer whose Young's modulus is greater than that of the sheet layer.

10 Claims, 5 Drawing Figures

F I G. 2a
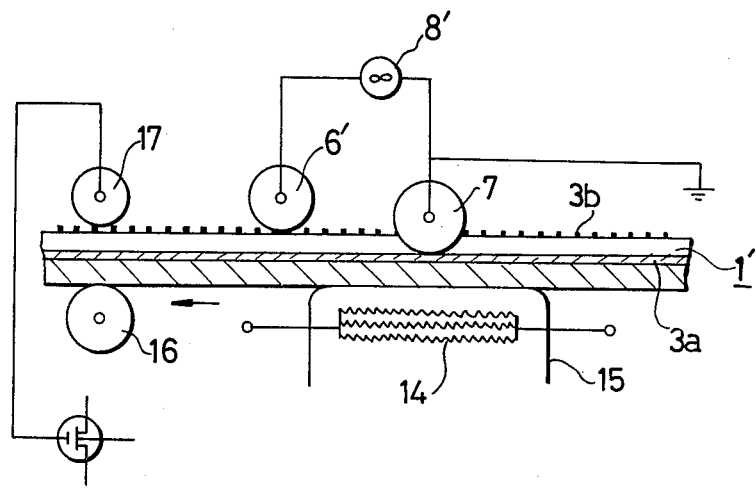
F I G. 2b
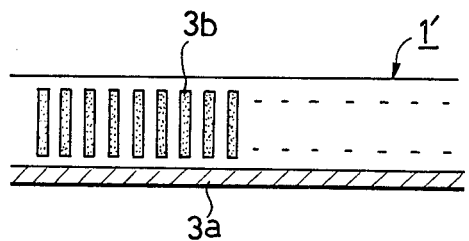
F I G. 3
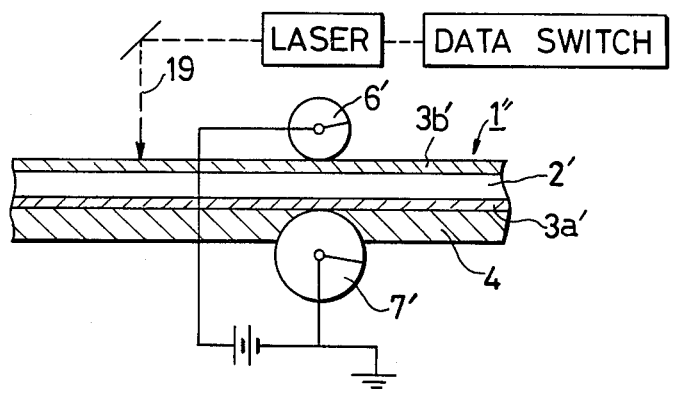

DATA RECORDING SHEET

BACKGROUND OF THE INVENTION

This invention relates to the structure of a data recording sheet in which data signals are recorded in a macromolecular material sheet as the distribution of polarization different locally in the direction of the surface of the sheet. The data signals thus recorded are reproduced in a pyroelectric or piezo-electric mode.

It is known in the prior art that some macromolecular material sheets are polarized by temperature and electric field to provide pyroelectricity and piezo-electricity. A method of recording and reproducing data has been proposed in the U.S. Pat. No. 3,772,518 in which, utilizing the fact that the polarization is caused only at the portions of such a sheet on which both temperature and electric field act and the polarization at the portions is eliminated or inverted by applying the opposite electric field together with temperature thereto, data signals are stored as polarization distribution in the macromolecular material sheet. The data signals thus stored are read out when required.

The fact that the polarization signal is both pyroelectric and piezo-electric, is advantageous since the signal stored can be reproduced not only by a pyroelectric method but also by a piezo-electric method. However, the pyroelectric method of reproducing signals is disadvantageous in that the piezo-electric action caused by variations of tension applied to the sheet may cause noise.

Examples of the macromolecular material with which data can be recorded by polarization (hereinafter referred to as "a polarizable macromolecular material" when applicable), are as described in the specification of U.S. Pat. No. 3,772,518. When a sheet of polarizable polymer such as polyvinylidene fluoride polymer, vinyl fluoride polymer, vinylidene fluoride group copolymer or the like is subjected to polarization, the polarity of the piezo-electricity which is generated by applying tension to the sheet is opposite to the polarity of the pyroelectricity which is caused by heating the sheet. Therefore, when the sheet is heated and strained simultaneously, the pyroelectricity and the piezo-electricity may be completely cancelled by each other. Furthermore, the piezo-electricity caused by releasing the tension and having the same sign as the pyroelectricity caused by heating becomes a noise signal.

Another example of the macromolecular material is a mixture of thermo-plastic resin and powder of ferrodielectric non-organic compound such as lead titanate, barium titanate, lead titanium zirconate, or the like. In general, when a non-organic ferrodielectric substance is polarized, the polarity of the piezo-electricity which is caused by straining the substance is the same as that of the pyroelectricity which is caused by heating the substance. Therefore, with a macromolecular material containing a large quantity of ferrodielectric powder, the piezo-electricity is often equal in polarity to the pyroelectricity. If, in this connection, reduction of the tension and heating are effected simultaneously, the piezo-electricity and the pyroelectricity are cancelled by each other.

A system in which recording and reproducing are carried out while a tape-shaped recording material wound on one reel is rewound on another reel, is extensively employed for recording and reproducing data in a tape-shaped recording material. However, this system is disadvantageous in that when the tape is run while being rewound, a tension is necessarily applied to the tape, and the tension varies greatly when the tape begins to run, or is stopped, or when the speed of running the tape is changed.

In addition, the tension is varied also when the reels are not smoothly operated. In this case, the variation of the tension is a periodically repeated vibration. If the piezo-electricity caused by this tension variation has the same polarity as the pyroelectricity caused in the data reproduction, then a noise signal is caused. If the piezo-electricity is opposite in polarity to the pyroelectricity, then the data is cancelled. At any rate, error signals are created.

In the case where the data is reproduced in a piezo-electric mode, the application of pressure must be effectuated perpendicular to the surface of the sheet to detect the difference in polarization between parts of the sheet. Also, in this case, the variation of tension applied to the sheet causes piezo-electric noise signals.

SUMMARY OF THE INVENTION

This invention provides a data recording sheet in which data signals are stored in a polarizable macromolecular material sheet layer as polarization locally different in the direction of the surface of the sheet layer. The sheet layer causing pyroelectric or piezo-electric polarization through polarization operation, and the data signals thus stored are reproduced in a pyroelectric or piezo-electric mode. According to the invention, the polarizable macromolecular material sheet layer is laminated through a thin intermediate electrode layer on a macromolecular substrate layer whose Young's modulus is greater than that of the sheet layer.

The polarizable macromolecular material layer of the data recording sheet according to the invention may be subjected to polarization in advance, or it may not be subjected to polarization at all. In the case where the entire surface of the layer is uniformly polarized, data signals are recorded by the actions of the polarization temperature and the electric field whose polarity is opposite to that of the DC electric field in the initial polarization, and the polarity of local polarization effected by this recording operation is opposite to that of the original polarization.

The recorded data signal is eliminated by the action of a uniform electric field opposite in direction to the electric field used in recording the data signal. As a result, the sheet is restored to its initial state such that its entire surface is uniformly polarized. Even in the case where the data recording sheet is not polarized, it is polarized in erasing the recorded data signal. That is, the sheet has been polarized before the second data signal recording is effectuated.

One surface of the polarizable macromolecular material layer, which is on the side of the substrate layer, is provided with the electrode layer. However, the opposite surface is provided entirely or partly with an electrode or electrodes, or such an electrode may be eliminated. That is, various examples of the data recording sheet according to the invention are provided and are selectively used according to various methods of recording and reproducing data signals.

It is not always required that the polarizable macromolecular material layer, the electrode layer and the substrate layer be equal in width and length. For instance, in the case where the data recording sheet is in the form of a tape, the width of the polarizable macromolecular material layer may be slightly larger than that of the substrate layer with the width of the intermediate electrode layer made equal to that of the polarizable macromolecular material layer.

Alternatively, the width of the substrate layer may be slightly larger than that of the polarizable macromolecular material layer with the width of the intermediate electrode layer made equal to that of the substrate layer. In this case, the intermediate electrode layer is exposed along at least one side of the tape. The intermediate electrode layer can be maintained in contact with another electrode which is coupled to the electrode source or ground.

The intermediate electrode layer may be exposed at, at least, one of the two end portions of the tape by changing the length of the polarizable macromolecular material layer or the substrate layer.

The substrate layer is made of macromolecular material which is higher in Young's modulus than the polarizable macromolecular material. For instance, where the polarizable macromolecular material is a polyvinylidene fluoride film, examples of a material useful for the substrate layer are polyester, polycarbonate, polyamide, polyimido, polyamidoimido, polysulfone, polyetherester, polyethersulfone, polyparaxylene, and the like.

It is desirable that, even when tension is applied to the recording sheet, stress exerted on its polarizable macromolecular material is minimum. Therefore, a polyethylterephthalate film rolled and orientated to a high degree is most suitable because its Young's modulus is very high. The thickness of the data recording sheet is not particularly limited. However, it is preferable that the minimum limit of thickness is defined so that the value (Young's modulus × thickness) of the polarizable macromolecular layer is larger than that of the substrate layer. In general, the thickness of the substrate layer is preferably equal to or larger than that of the polarizable macromolecular layer. The maximum limit of thickness is to the extent that the running tape can be freely wound on the roll. Alternatively, the thickness of the sheet may be determined from economization or the like. In general, the maximum thickness of the sheet is less than 5 mm.

The data recording sheet according to the invention and methods of recording and reproducing data using the data recording sheet will now be described with reference to the accompanying drawings.

BRIEF DESCRIPTION OF THE DRAWINGS

The accompanying drawings are theoretical diagrams for a description of data recording sheets according to this invention, and methods of recording and reading data therein.

FIGS. 1 through 3 show different data recording sheets and different methods of recording and reading data therein, respectively. In particular.

FIG. 2(a) is a schematic side view of a second embodiment of a system for recordation of data on the tape of this invention;

FIG. 2(b) is a top view of the tape of the second embodiment of this invention; and FIG. 3 is a schematic side view of a third embodiment of a recording tape of this invention.

DESCRIPTION OF THE PREFERRED EMBODIMENTS

Figure 1A:
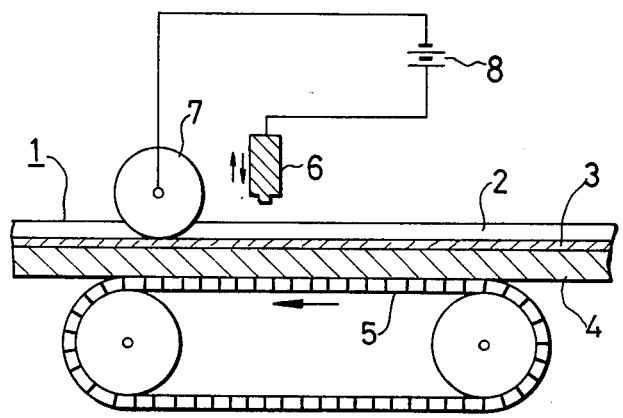
FIG. 1(a) is a schematic side view of a first embodiment of a system for recordation of data on the tape of this invention.

Referring to FIG. 1, reference numeral 1 designates a data recording sheet according to this invention. The data recording sheet 1 is in the form of a lamination tape comprising a substrate layer 4 made of a polyester film which is orientated to a high degree, an electrode layer 3 formed on the substrate layer 4 by vacuum-evaporating aluminum, and a polarizable macromolecular material layer 2 made of, for instance, a polyvinylidene fluoride film which is uniaxially rolled and orientated. The layer 2 is bonded to the electrode layer 3 (the bonding agent layer not shown). In this example, the width of each of the layers 3 and 4 is slightly larger than that of the layer 2, so that the electrode layer 3 is exposed on one side of the tape.

In recording data on this tape, while the tape is run by a drive belt 5, an upper electrode 6 heated to the polarization temperature is moved up and down in response to data signals. When the upper electrode 6 is brought into contact with a part of the tape, the polarizable macromolecular material of that part is subjected to polarization by the DC electric field created between the upper electrode and the intermediate electrode layer 3. In FIG. 1, reference numeral 7 designates a roll-shaped electrode which is in contact with the electrode layer 3. The electrodes 6 and 7 are connected to a DC source 8.

Figure 1B:
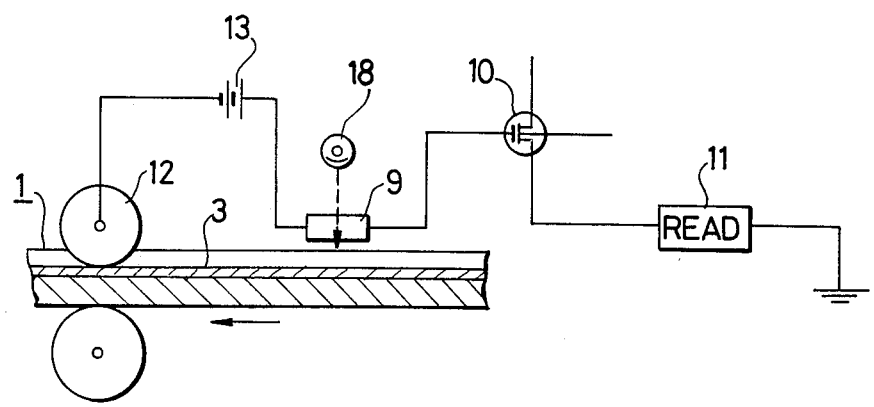
FIG. 1(b) is a schematic side view of a first embodiment of the compatible system for reading the data stored on the tape of this invention.

FIG. 1(b) shows a device for reading the data which have been recorded in the tape as described with reference to FIG. 1(a). The tape 1 is run while maintained a predetermined distance from a suitable transparent glass electrode 9. An infrared ray lamp 18 is provided above the transparent electrode 9 to heat the tape through the transparent electrode 9. When the tape is heated by the lamp 18, pyroelectricity is generated according to the polarization on the tape. Therefore, as the tape 1 is passed below the electrode 9, charges are induced in the electrode 9.

The output of the electrode 9 is amplified by an amplifier 10 formed with, for instance, field-effect transistors (FET), and is then read by a signal reading device 11. In FIG. 1(b), reference numeral 12 designates a roll electrode which is in contact with the intermediate electrode layer 3, and reference numeral 13 designates a bias electric source.

A data recording data 1' shown in FIG. 2(a) comprises a polarizable macromolecular material layer 2, a substrate layer 4, and an electrode layer 3a between the two layers 2 and 4 similarly as in the tape 1 described before. The tape further comprises a number of electrode 3b which extend transversely like stripes on the layer 2 as shown in FIG. 2(b).

In recording data on the tape 1', the tape is run along a stand 15 incorporating a heater 14 so as to be heated to the polarization temperature. The stripe-shaped electrode of the tape which has been heated to the polarization electrode are polarized in the directions of voltage application by the AC high voltages 8' of data signals which are applied across the electrodes 3a and 3b by roll-shaped electrodes 6' and 7. In this case, it is necessary that the period of the AC data signal be in synchronization with the rate of movement of the stripe-shaped electrodes.

The data thus recorded are read as follows: The heater 14 is turned off to reduce the temperature of the tape to room temperature. Then, the tape is passed between rolls 16 and 17. As a result, plus or minus piezo-electricity is generated in the electrodes 3b according to the tape polarization directions. Therefore, the data can be read in a manner as in the case of FIG. 1(b).

FIG. 3 shows a third embodiment of the data recording tape 1″ which comprises a polarizable macromolecular material layer 2′, and a transparent or semi-transparent layer 3b′ of a very thin film which is formed on the layer 2′ by vacuum-evaporating gold. The polarizable macromolecular material layer 2′ is colored with black pigment to sufficiently absorb heat rays. In this example, the width of each of the layer 2′ and its intermediate electrode layer 3a′ is larger than its substrate layer 4.

Data signals are recorded on the tape 1″ as follows: While a DC high voltage is applied to the tape by roll-shaped electrodes 6′ and 7′ which are in contact with the electrode layers 3a′ and 3b′, respectively, the surface of the electrode layer 3b′ is scanned with a laser beam 19 which is turned on and off according to data signals to be recorded. As a result, the polarizable macromolecular material layer is intermittently heated to the polarization temperature according to the on-off operation of the laser beam 19; that is, the layer is polarized. Pyroelectricity is generated in the polarized part of the tape by scanning the latter with a continuous laser beam low in intensity. Therefore, the recorded data can be read as in the above-described examples.

Heating the tape to read the data which are recorded in the tape in a polarization or pyroelectricity mode may be achieved by high-frequency heating, ultrasonic heating, or the like. Furthermore, scanning with ultrasonic waves may be effectively employed for reading the data which are recorded in a piezo-electricity mode.

With the invention, the piezo-electric noise caused by the tension of the data recording sheet can be greatly reduced, and further more the elongation of the tape due to the tension can be greatly reduced. Therefore, in the case where data signals are recorded and read out by the scan of a laser beam, the coordinates of a polarization which is caused in the recording sheet by an input signal can be readily coincided with the position of scanning in reading the signal with high accuracy. Accordingly, it is possible to reduce the size of each of the polarization coordinates and the distance between adjacent polarization coordinates, which leads to an increase of the data recording density.

A polarization film which is obtained by subjecting to polarization a polyvinylidene fluoride uniaxially rolled and which has a piezo-electric constant $6 \times 10^{-7}$ cgsesu and a pyroelectric coefficient $4 \times 10^{-9}$ coulombs/cm² C at approximately room temperature. If the same charge as the charge created by the pyroelectricity of $4 \times 10^{-9}$ coulombs which is caused by the variation of temperature 1° C. is provided, then the tension in this case can be calculated to be about $20 \times 10^5$ newtons/m² from the piezo-electric constant.

It is assumed that a polyvinylidene fluoride film used as the recording tape is $4\mu$ in thickness and 5 mm in width (sectional area being $2 \times 10^{-2}$ mm²). If the aforementioned tension $20 \times 10^5$ newtons/m² is exerted on the tape sectional area $2 \times 10^{-4}$ cm², then the value of the force applied to the film is merely about four gram-forces (gw). Of course, a force exerted on a recording tape being run depends on the width and speed of the film and the surface conditions of the film and the feeding roll. However, it is in general, of the order of several tens to several hundreds of gram-forces (gw). The variation of this force corresponds to the variation in temperature of from several degrees to several tens of degrees, with the result that noises are caused in reading the data recorded in the tape.

With a tape obtained by laminating a polyvinylidene fluoride film having Young's modulus of, for instance 240 kg/mm² on a polyester film having a Young's modulus 720 kg/mm², a thickness of $10\mu$ and a width of 6 mm (the sectional area being $6 \times 10^{-2}$ mm²), only 1/10 of the force applied to the tape is exerted on the polyvinylidene fluoride film layer. Accordingly, the piezo-electricity is reduced to 1/10, and therefore the noise is greatly reduced.

It is apparent that modifications of this invention can be made without departing from the scope of this invention.

What is claimed is:

1. In a data recording sheet in which data signals are stored in a polarizable macromolecular material sheet layer having a different polarization locally in the direction of the surface of said sheet layer, said sheet layer causing pyroelectric or pizeo-electric polarization through polarization operation, and said data signals thus stored are reproduced in a pyroelectric or piezo-electric mode, the improvement comprising: a macromolecular substrate layer, a thin intermediate electrode layer adjacent said substrate layer and said polarizable macromolecular material sheet layer adjacent to said intermediate electrode layer and laminated through said thin intermediate electrode layer on to said macromolecular substrate layer, said substrate layer having a Young's modulus greater than that of said sheet layer.

2. A data recording sheet as claimed in claim 1, wherein one surface of said polarizable macromolecular material sheet layer opposite to the surface of said sheet layer on which said intermediate electrode layer is provided is devoid of any electrodes.

3. A data recording sheet as claimed in claim 1, further comprising electrode means provided on one surface of said polarizable macromolecular material sheet layer opposite to the surface of said sheet layer on which said intermediate electrode layer is provided.

4. A data recording sheet as claimed in claims 1, 2 or 3, wherein the width of both said polarizable macromolecular material sheet layer and intermediate electrode layer is larger than that of said macromolecular substrate layer, wherein said intermediate electrode layer is exposed along at least one side of said data recording sheet.

5. A data recording sheet as claimed in claim 1, wherein said data recording sheet is a length tape.

6. A data recording sheet as claimed in claim 5, wherein the width of both said macromolecular substrate layer and intermediate electrode layer is larger than that of said polarizable macromolecular material sheet layer wherein said intermediate electrode layer is exposed along at least one side of said tape.

7. A data recording sheet as in claims 1, 2 or 3 wherein said electrode layer is formed by vacuum evaporation of aluminum.

8. A data recording sheet as in claim 7 wherein said substrate layer comprises a highly orientated polyester film and said polarizable macromolecular material is polyvinylidene fluoride film.

9. A data recording sheet as in claims 1 or 2 wherein said electrode layer comprises a layer of vacuum evaporated gold.

10. A data recording sheet as in claim 9 wherein said polarizable macromolecular material contains a heat absorbing pigment.

* * * * *